Nov. 21, 1950     T. H. RICHTER     2,530,730
DISPENSING CONTAINER
Filed Jan. 29, 1948
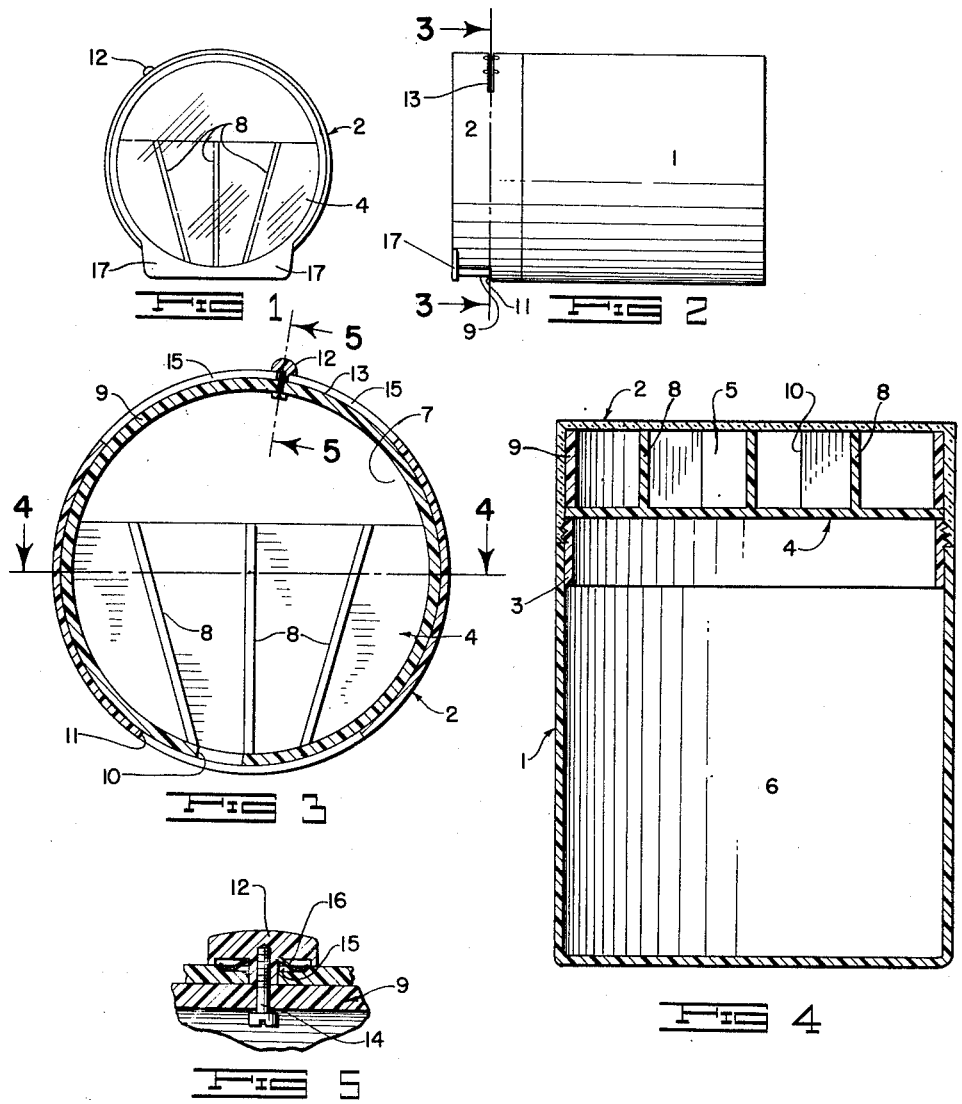
INVENTOR.
THOMAS H. RICHTER
BY Lyon & Lyon
ATTORNEYS Patented Nov. 21, 1950

2,530,730

UNITED STATES PATENT OFFICE 2,530,730

DISPENSING CONTAINER

Thomas H. Richter, Los Angeles, Calif.

Application January 29, 1948, Serial No. 5,030

10 Claims. (Cl. 222—427)

My invention relates to dispensing containers and included in the objects of my invention are:

First, to provide a dispensing container which is particularly suitable for free flowing dry materials, such as coffee;

Second, to provide a dispensing container which has a dispensing or measuring compartment into which a limited quantity of the material to be dispensed is provided by tilting the container, the dispensing compartment being so arranged that the material may be discharged in substantially equal amounts; for example, if the container be intended for ground coffee the dispensing section may discharge a supply of coffee for two, four, six or eight cups;

Third, to provide a dispensing container which is particularly simple of manufacture and well adapted for construction from molded plastics.

With the above and other objects in view, as may appear hereinafter, reference is directed to the accompanying drawings in which:

Figure 1 is an end view of my dispensing container;

Figure 2 is a side view thereof;

Figure 3 is an enlarged sectional view thereof taken through 3—3 of Figure 2;

Figure 4 is a longitudinal sectional view thereof taken through 4—4 of Figure 3; and Figure 5 is a further enlarged detailed view taken through 5—5 of Figure 3.

My dispensing container includes a container member 1 and a cover member 2. These are cylindrical in form and are adapted to be joined in complementary relation. The container member 1 is provided at its open end with an internal band 3 which projects beyond the container and is externally screw-threaded to fit screw threads provided within the margin of the cover member 2.

The cover member 2 is transparent or translucent and receives a partial partition 4 disposed parallel with the top or head of the cover. The partition divides the interior of the container into a dispensing compartment 5 and a reservoir compartment 6. The partition 4 occupies somewhat more than half the area of the cover 2 so that above the partition 4 there is provided an opening 7 which connects the compartments 5 and 6.

Ribs 8 are disposed between the partition 4 and the head of the cover 2. The ribs may be integral with either the partition or the cover 2 and divide the dispensing compartment into equal sections. As illustrated, four sections are thus provided. Fitted within the cylindrical walls of the dispensing compartment 5 is a gate band 9 having a gate opening 10 therein. The ribs 8 extend to the gate band but permit rotation of the gate band around their ends. The section of the dispensing compartment walls embracing the ribs 8 is provided with a discharge slot 11. The extremities of the slot 11 extend beyond the outmost ribs so that all sections of the dispensing compartment share the discharge slot 11.

The gate opening 10 is of proper width to expose a single section and may be moved by rotating the band to permit discharge of material from any section of the dispensing compartment. Movement of the gate band is accomplished by a handle 12 which projects upwardly through a slit 13 provided in the cylindrical wall of the cover 2, preferably at its side opposite from the slot 11. The handle is fastened to the gate band 9 by a screw 14. In order that the handle may be moved conveniently to predetermined positions, the margins of the slit 13 may be provided with recesses 15 and the handle may receive a suitable leaf spring 16.

In order to enable the dispensing container to lay on its side, preferably with the discharge slot 11 lowermost, the cover 2 is provided with foot lugs 17.

Operation of my dispensing container is as follows:

The material to be dispensed, such as coffee, is poured into the container member 1, and the cover is screwed in position. When it is desired to dispense a quantity of material the container is inverted to permit the contents to pour through the opening 7 and fill the dispensing compartment 5. The container is then held in a horizontal position with the discharge slot 11 lowermost, whereupon the gate band 9 is rotated to open one or more of the sections and permit discharge of its contents. In the dispensing of coffee the container is merely held over the coffee receiving compartment.

It is preferred to avoid filling the reservoir portion of the container too full so that when the coffee is dispensed from the compartment 5 additional coffee from the reservoir compartment does not flow through the opening 7.

While I have described the preferred embodiments of my invention, I am not limited to any of the details herein set forth except as described in the following claims.

I claim:

1. A dispensing container, comprising: complementary members forming a container for dry pourable material and a cover therefor; a partial partition positioned in one of said members and defining therewith a dispensing compartment; ribs between said partition and member dividing said compartment into dispensing sections, said member having a discharge slot embracing said ribs and communicating with all of said dispensing sections; and a gate member movable across said discharge slot and having a dispensing aperture adapted to expose said dispensing sections in sequence as said gate member is moved.

2. A dispensing container, comprising: complementary members forming a container for dry pourable material and a cover therefor; a partial partition confronting an end wall of one of said members; converging ribs between said partition and said end wall dividing the space therebetween into a series of dispensing sections adapted to be filled by spilling the contents of said container over said partition, said member having a discharge opening encompassing said ribs to expose all of said dispenser sections; and a gate member having an aperture to expose a single section and movable across said discharge opening.

3. A dispensing container, comprising: means defining a cylindrical case; a partial partition confronting an end wall of said case to define therewith a dispensing compartment, one wall of which is formed by the curved side of said case; ribs dividing said compartment into dispensing segments; said curved wall having a dispensing opening embracing said ribs to expose all of the dispensing segments of said compartment; and a gate band conforming to said curved wall and having an aperture for exposing said segments in sequence when the gate band is moved arcuately relative to said curved wall.

4. A dispensing container, comprising: means defining a cylindrical case; a partial partition confronting an end wall of said case, the cylindrical portion of said case between said end wall and partition having a discharge opening therein; ribs disposed between said partition and end wall and directed toward said discharge opening, said ribs defining a series of dispensing sections; and a gate band conforming to the cylindrical wall and having an aperture to expose said dispensing sections in sequence as said gate band is moved arcuately.

5. A dispensing container, comprising: means defining a cylindrical case, said case having a discharge slot in its cylindrical wall adjacent one end; a partition confronting said end wall and defining therewith a dispensing compartment in which is located said discharge slot, and defining with the remainder of the case a storage compartment, said partition defining an opening connecting said compartments; ribs between said partition and the adjacent end of said case to divide the dispensing compartment into sections all communicating with said discharge slot; and a gate member having a dispensing aperture movable across said discharge slot to select a section of said dispensing compartment.

6. A dispensing container, comprising: means defining a cylindrical case, said case having a discharge slot in its cylindrical wall adjacent one end; a partition confronting said end wall and defining therewith a dispensing compartment in which is located said discharge slot, and defining with the remainder of the case a storage compartment, said partition defining an opening connecting said compartments; ribs within said dispensing compartment converging to said discharge slot opening and dividing said compartment into sections; and a gate band movable about the axis of said case across said discharge slot, said gate band being apertured to expose a selected section of said dispensing compartment.

7. A dispensing container, comprising: means defining a cylindrical case, said case having a discharge slot in its cylindrical wall adjacent one end; a partition confronting said end wall and defining therewith a dispensing compartment in which is located said discharge slot, and defining with the remainder of the case a storage compartment, said partition defining an opening connecting said compartments; ribs between said partition and the adjacent end of said case to divide the dispensing compartment into sections all communicating with said discharge slot; and a gate band mounted within said dispensing compartment and movable about the axis of said case between said discharge slot and the adjacent extremities of said ribs, said gate band having an aperture to expose a selected section of said dispensing compartment.

8. A dispensing container, comprising: means defining a cylindrical case, said case having a discharge slot in its cylindrical wall adjacent one end; a partition confronting said end wall and defining therewith a dispensing compartment in which is located said discharge slot, and defining with the remainder of the case a storage compartment, said partition defining an opening connecting said compartments; ribs within said dispensing compartment converging to said discharge slot and dividing said compartment into sections; and a gate band mounted within said dispensing compartment and movable about the axis of said case between said discharge slot and the adjacent extremities of said ribs, said gate band having an aperture to expose a selected section of said dispensing compartment.

9. A dispensing container, comprising: a container member; a complementary cover member having a dispensing slot in its side wall; a partial partition spaced from the end wall of the cover member to form a dispensing compartment in communication with said container member; ribs within said dispensing compartment directed edgewise toward said discharge slot and dividing said dispensing compartment into sections; and a gate member movable across said dispensing slot and apertured to expose a selected section of said dispensing compartment.

10. A dispensing container, comprising: a container member; a complementary cover member having a dispensing slot in its side wall; a partial partition spaced from the end wall of the cover member to form a dispensing compartment in communication with said container member; ribs within said dispensing compartment directed edgewise toward said discharge slot and dividing said dispensing compartment into sections; the wall of said cover member occupied by said dispensing slot being cylindrical; a gate band fitted within said cylindrical wall of said cover member and arranged to cross the ends of said ribs adjacent said discharge slot, said gate band being apertured to expose a selected section of said dispensing compartment.

THOMAS H. RICHTER.

No references cited.